United States Patent
Choi et al.

(10) Patent No.: US 7,586,302 B2
(45) Date of Patent: Sep. 8, 2009

(54) DETECTION DEVICE AND ROTATION ANGLE SENSOR

(75) Inventors: Hong Eui Choi, Nagaokakyo (JP); Yukinori Ueda, Muko (JP); Hiroyuki Kishishita, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 14 days.

(21) Appl. No.: 11/964,160

(22) Filed: Dec. 26, 2007

(65) Prior Publication Data

US 2008/0303514 A1    Dec. 11, 2008

Related U.S. Application Data

(63) Continuation of application No. PCT/JP2006/312755, filed on Jun. 26, 2006.

(30) Foreign Application Priority Data

Jun. 30, 2005    (JP)    ............................. 2005-192909

(51) Int. Cl.
G01B 7/30    (2006.01)
G01R 33/07    (2006.01)
(52) U.S. Cl. .................. 324/207.25; 324/244; 324/251
(58) Field of Classification Search ......... 324/173–174, 324/207.2, 207.25, 244, 251; 73/514.31, 73/514.39, 862.69, 862.192, 862.193; 123/612, 123/617; 702/92, 94, 96; 338/32 R, 32 H; 257/421, 427; 361/732, 736, 739–740, 747, 361/752, 757, 759; 174/50.54
See application file for complete search history.

(56) References Cited

U.S. PATENT DOCUMENTS 5,867,360 A * 2/1999 Kishishita et al. ........... 361/292

6,731,194 B1    5/2004 Abe
2001/0015889 A1 *   8/2001 Nariyama ................... 361/759

(Continued)

FOREIGN PATENT DOCUMENTS

EP    1 156 249 A1    11/2001

(Continued)

OTHER PUBLICATIONS

Official communication issued in the International Application No. PCT/JP2006/312755, mailed on Aug. 29, 2006.

(Continued)

*Primary Examiner*—Bot LeDynh
(74) *Attorney, Agent, or Firm*—Keating & Bennett, LLP (57) ABSTRACT

A detection device and a rotation angle sensor include a case body and a cover member. A support portion in the case body is provided with fitting protuberances fitted in fitting holes of a printed board, on which a detection component is mounted, so as to position the printed board. Each protuberance has ribs protruding from an outer peripheral surface thereof. The ribs are elastically or plastically deformed by contact with an inner peripheral surface of the corresponding fitting hole of the board, and position the board along a support surface of the support portion. A projecting portion of the cover member is elastically or plastically deformed so as to urge the board toward the support surface of the support portion so that the board is clamped between the projecting portion and the support surface and is positioned in a direction perpendicular to the support surface of the support portion.

14 Claims, 5 Drawing Sheets

FOREIGN PATENT DOCUMENTS

| | | |
|---|---|---|
| JP | 03-063525 A | 3/1991 |
| JP | 09-326567 A | 12/1997 |
| JP | 11-101812 A | 4/1999 |
| JP | 2005-049285 A | 2/2005 |
| WO | WO 2008/113336 A2 | 9/2008 |

OTHER PUBLICATIONS

Official communication issued in counterpart German Application No. 11 2006 001 393.9 mailed on Mar. 30, 2009.

* cited by examiner

DETECTION DEVICE AND ROTATION ANGLE SENSOR

BACKGROUND OF THE INVENTION

1. Field of the Invention

The present invention relates to a detection device and a rotation angle sensor, and more particularly, to a detection device and a rotation angle sensor in which a substrate, on which a detection component for detecting the physical quantity, such as magnetism, is mounted, is held at a predetermined position in an outer case.

2. Description of the Related Art

Figures 10, 11:
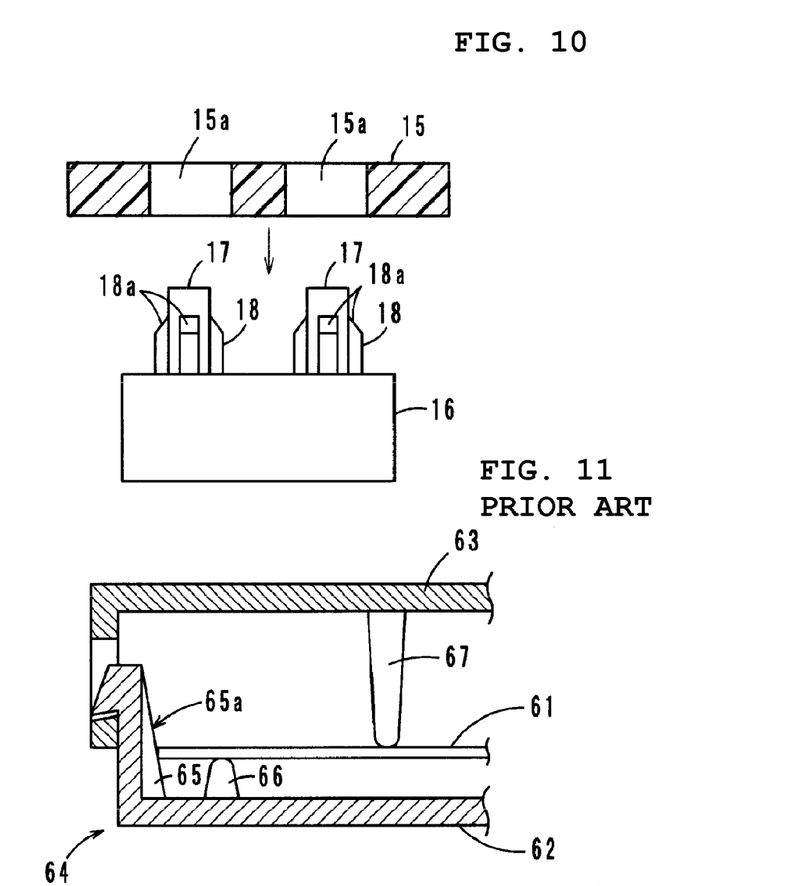
FIG. 10 is a cross-sectional view showing a modification of ribs provided on fitting protuberances.
FIG. 11 is a cross-sectional view showing a known case structure.

In known electronic devices, such as hybrid ICs and various sensors, in which a substrate having elements mounted thereon is held in an outer case, the outer case is defined by a case body and a cover member attached to an opening of the case body, and the substrate is clamped between the case body and the cover member and is thereby held at a predetermined position in the outer case. For example, Japanese Unexamined Patent Application Publication No. H9-326567 discloses a resin-case fitting structure in which a printed board 61 is stored in a resin case 64 while being sandwiched between a body portion 62 and a cover portion 63 that define the resin case 64, as shown in FIG. 11. The body portion 62 includes ribs 65 each having an inclined portion 65a, and protuberances 66 for regulating the tilting of the printed board 61, and the cover portion 63 includes a projecting portion 67. The printed board 61 is pressed against the inclinations 65a by the projecting portion 67, so that the position of the printed board 61 is regulated in the resin case 64 by the protuberances 66 and the inclinations 65a.

Figure 12:
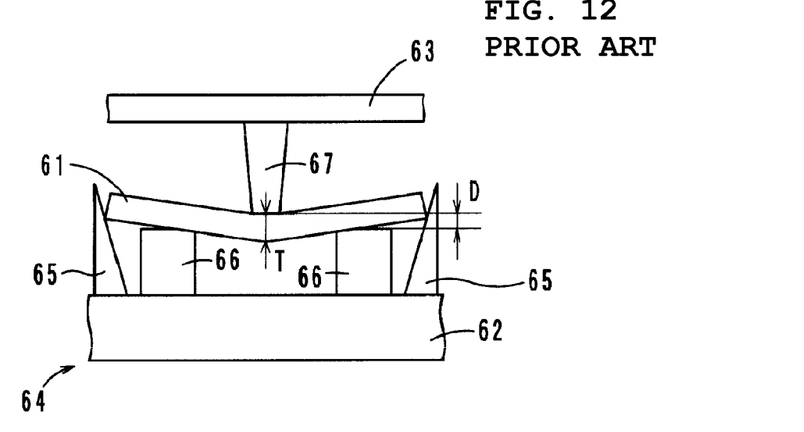
FIG. 12 is an explanatory view showing a problem of the case structure shown in FIG. 11.

In the above-described printed-board fixing structure, when the cover member 63 is fitted on the body portion 62, the printed board 61 is similarly fixed to the resin case 64. Therefore, assembly is easy and assembly efficiency is high. Unfortunately, there are the following problems. That is, as shown in FIG. 12, when it is assumed that D represents the distance between leading ends of the protuberances 66 of the body portion 62 and a leading end of the projecting portion 67 of the cover portion 63 and T represents the thickness of the printed board 61 in a state in which the cover portion 63 is fixed to the body portion 62, the printed board 61 is clamped between the protuberances 66 and the projecting portion 67 on the condition that $D \leq T$. In this case, the bending amount of the printed board 61 is equal to T−D. The distance D has an value α based on dimensional variations of the body portion 62, the cover portion 63, the protuberances 66, and the projecting portion 67. For this reason, the distance D needs to be decreased by the value α or more in order for the printed board 61 to be clamped between the protuberances 66 and the projecting portion 67.

However, when the distance D between the leading ends of the protuberances 66 and the leading end of the projecting portion 67 decreases, the bending amount T−D of the printed board 61 increases. This increases the bending stress of the printed board 61, and also increases breaking, peeling, and soldering cracks of patterns on the printed board 61. Further, when the dimensional accuracy of the body portion 62 and the cover portion 63 is increased and the value α is decreased in order to reduce the bending stress of the printed board 61, the production cost is increased.

SUMMARY OF THE INVENTION

In order to overcome the problems described above, preferred embodiments of the present invention provide a detection device and a rotation angle sensor which reduce the bending stress of a substrate, which avoid failures such as breaking, peeling, and soldering cracks of patterns, and which provide high reliability and low production cost.

In a detection device according to a preferred embodiment of the present invention, a substrate that supports a detection component arranged to detect a physical quantity is stored in an outer case including a case body and a cover member fitted in an opening of the case body, and the substrate is held at a predetermined position in the outer case by the cover member and the case body. The case body includes a support portion protruding from an inner bottom surface of the case body so as to support the substrate. The cover member includes a projecting portion projecting toward the support portion so that the substrate is clamped between the projecting portion and the support portion. The support portion includes a fitting protuberance fitted in a fitting hole provided in the substrate so as to position the substrate on the support portion. The fitting protuberance has a rib protruding from an outer peripheral surface of the fitting protuberance in the radial direction. The projecting portion of the cover member is formed of a material that is elastically or plastically deformed by contact with the substrate. The rib of the fitting protuberance is formed of a material that is elastically or plastically deformed by contact with an inner peripheral surface of the fitting hole of the substrate.

In the detection device according to a preferred embodiment of the present invention, the substrate is fixed at a predetermined position in the outer case along a support surface of the support portion by elastic or plastic deformation of the rib of the fitting protuberance. Also, the substrate is urged against the support surface of the support portion of the case body by elastic or plastic deformation of a leading end of the projecting portion of the cover member, is thereby clamped therebetween, and is fixed at a predetermined position in a direction that is substantially perpendicular to the support surface of the support portion. In this case, even when the diameter of the fitting protuberance and the projecting length of the projecting portion are increased in anticipation of dimensional variations of the cover member, the case body, and the fitting hole of the substrate, since the rib of the fitting protuberance and the projecting portion are elastically or plastically deformed so as to reduce the force exerted from the rib of the fitting protuberance and the projecting portion of the cover member onto the substrate. This reduces the stress produced in the substrate.

In a rotation angle sensor according to a preferred embodiment of the present invention, a substrate that supports a detection component for detecting the rotation amount of a shaft is stored in an outer case including a case body and a cover member fitted in an opening of the case body. The shaft extends through the case body toward the cover member, and is rotatably mounted in the outer case. The substrate is held at a predetermined position in the outer case by the cover member and the case body. The case body includes a support portion protruding from an inner bottom surface of the case body so as to support the substrate, and the cover member includes a projecting portion projecting toward the support portion so that the substrate is clamped between the projecting portion and the support portion. The support portion includes a fitting protuberance fitted in a fitting hole provided in the substrate so as to position the substrate on the support portion. The fitting protuberance includes a rib protruding from an outer peripheral surface of the fitting protuberance in the radial direction. The projecting portion of the cover member is formed of a material that is elastically or plastically deformed by contact with the substrate, and the rib of the fitting protuberance is formed of a material that is elastically or plastically deformed by contact with an inner peripheral surface of the fitting hole of the substrate.

The operation of the rotation angle sensor according to a preferred embodiment of the present invention is similar to that of the above-described detection device. Further, a contact type sensor for detecting the rotation of the shaft and a non-contact type sensor for detecting the rotation of the shaft can be produced by using the same outer case, according to user's demands for reliability and cost of the rotation angle sensor, and the outer case can be commonly used for a plurality of types of rotation angle sensors.

In the rotation angle sensor according to a preferred embodiment of the present invention, when the detection component detects the rotation amount of the shaft in a non-contact manner, since the rotation amount of the shaft is detected in a non-contact manner, an electrical contact device for detecting the rotation amount of the shaft is unnecessary. Therefore, trouble peculiar to the electrical contact devices, for example, noise and detection failure of a rotation signal due to a poor connection, is avoided.

The detection component may be a magnetic detection element that detects the rotation amount of the shaft by detecting magnetism of a magnetism generator attached to the shaft. Since the magnetic detection element detects magnetism of the magnetism generator, the rotation amount of the shaft is detected in a non-contact manner. This avoids trouble such as noise and detection failure of a rotation signal due to a poor connection.

The detection component may include electrical contact element that cooperates with the shaft, and a conversion element that outputs an electrical signal corresponding to a contact position of the electrical contact element. In this case, the rotation amount of the shaft can be detected with the electrical contact element and the conversion element which are produced at a relatively low cost and whose specifications can be easily changed.

Alternatively, the detection component may be a potentiometer attached to the substrate. In general, the cost of the potentiometer is low, and the specifications of the rotation sensor can be easily changed by simply changing the specifications of the potentiometer mounted on the substrate.

In the detection device or the rotation angle sensor according to preferred embodiments of the present invention, when the cover member is fitted in the opening of the case body, a retaining claw provided in one of the case body and the cover member may be engaged with a retaining portion provided in the other. The cover member is fixed to the opening of the case body by so-called snap fitting. The retaining claw may have an inclined portion. This allows the retaining claw and the retaining portion to be easily engaged, and the case body and the cover member are firmly fixed by the contact of the inclined portion with the retaining portion.

The case body and the cover member may be welded or bonded to each other. By welding or bonding the cover member to the opening of the case body, airtightness of the outer case is enhanced.

As described above, according to preferred embodiments of the present invention, even when the diameter of the fitting protuberance and the projecting length of the projecting portion are increased in anticipation of dimensional variations of the cover member and the case body of the outer case and the fitting hole of the substrate, since the rib of the fitting protuberance and the projecting portion are elastically or plastically deformed, the force exerted from the rib of the fitting protuberance and the projecting portion of the cover member onto the substrate is reduced, and the stress produced in the substrate is reduced. Consequently, product failures are prevented from being caused by breaking, peeling, and soldering cracks of patterns resulting from deformation of the substrate, and reliable products can be obtained. Further, the production efficiency is improved, and the product yield is increased. Therefore, the production cost can be reduced greatly.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

A detection device and a rotation angle sensor according to preferred embodiments of the present invention will be described below with reference to the attached drawings.

Figure 1:
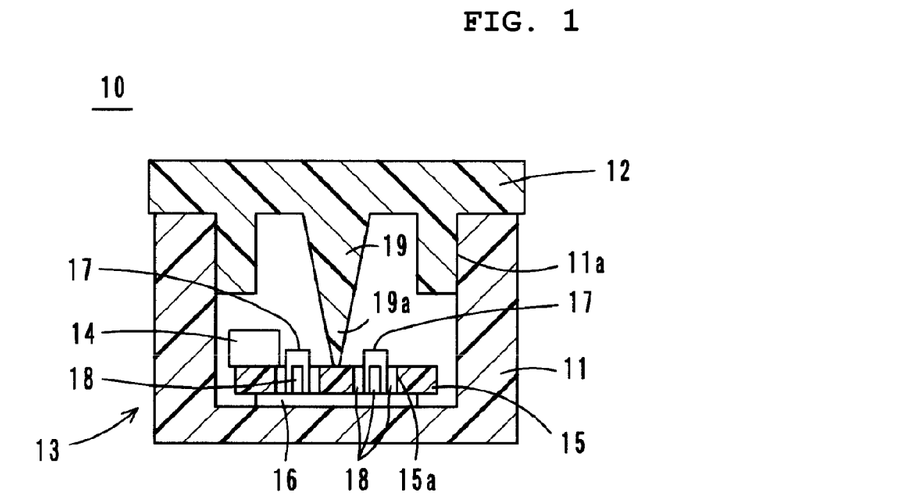
FIG. 1 is a longitudinal sectional view showing a first preferred embodiment (a detection device) according to the present invention.
Figure 2:
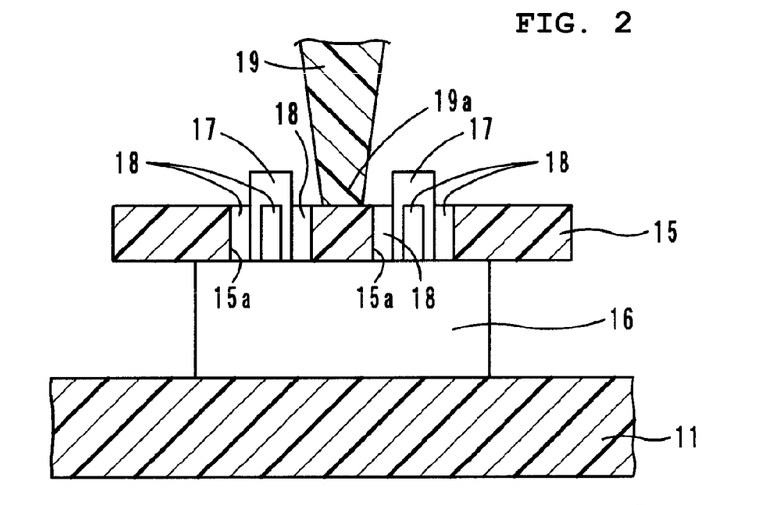
FIG. 2 is an enlarged sectional view of the principal portion shown in FIG. 1.
Figure 3:
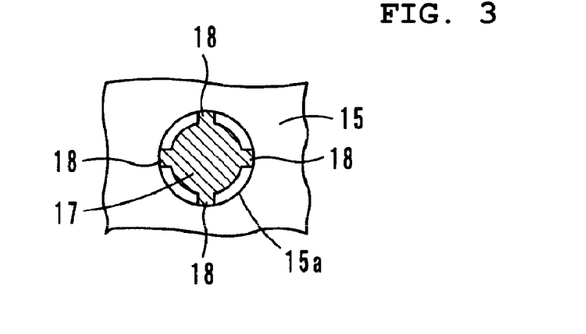
FIG. 3 is an explanatory view showing a state in which a fitting protuberance is fitted in a fitting hole of a substrate and ribs are in pressing contact with an inner peripheral surface of the fitting hole.

First Preferred Embodiment (FIGS. 1 to 3)

FIG. 1 is a longitudinal sectional view of a detection device according to a first preferred embodiment of the present invention, and FIG. 2 is an enlarged partial sectional view of the detection device. A detection device 10 includes an outer case 13 defined by a case body 11 and a cover member 12 fitted in and fixed to an opening 11a of the case body 11 with adhesive or the like. A printed board 15 for supporting a detection component 14, such as a Hall element for sensing magnetism, is stored in the case body 11. The printed board 15 is also held at a predetermined position in the outer case 13 by the cover member 12 and the case body 11, as will be described below.

The case body 11 includes a support portion 16 that protrudes from an inner bottom surface of the case body 11 so as to support the printed board 15. The support portion 16 is provided with a plurality of fitting protuberances 17. The fitting protuberances 17 perpendicularly protrude from a support surface for the printed board 15. As shown in FIG. 3, the fitting protuberances 17 are fitted in fitting holes 15a provided in the printed board 15, thus positioning the printed board 15. Each fitting protuberance 17 has ribs 18 protruding in the radial direction from an outer peripheral surface of the fitting protuberance 17.

The support portion 16, the fitting protuberances 17, and the ribs 18 preferably are formed integrally with the case body 11 of a plastically or elastically deformable resin material. Because of the above-described property of the resin material, the ribs 18 of each fitting protuberance 17 are elastically or plastically deformed by contact with an inner peripheral surface of the corresponding fitting hole 15a provided in the printed board 15, as shown in FIG. 3. By this elastic or plastic deformation of the ribs 18 of the fitting protuberances 17, the printed board 15 is positioned in the outer case 13 along the support surface of the support portion 16.

The cover member 12 preferably is formed of a resin material, and includes a projecting portion 19 that projects toward the support portion 16 of the case body 11. The printed board 15 is clamped between a leading end 19a of the projecting portion 19 and the support portion 16. The projecting portion 19 (cover member 12) is formed of a material such that the leading end 19a is elastically or plastically deformed by contact with the printed board 15. The printed board 15 is urged against the support surface of the support portion 16 in the case body 11 by elastic or plastic deformation of the projecting portion 19. The printed board 15 is thereby clamped between the projecting portion 19 and the support surface, and is positioned in the outer case 13 in a direction perpendicular to the support surface of the support portion 16.

The projecting portion 19 may be formed integrally with the cover member 12 by the same resin material. Alternatively, the projecting portion 19 may be formed of an elastically or plastically deformable resin material that is different from the material of the cover member 12.

In the detection device 10 having the above-described configuration, when the fitting protuberances 17 are fitted in the fitting holes 15a of the printed board 15 and the cover member 12 is fitted in and fixed to the opening provided at one end of the case body 11, the printed board 15 is fixed at a predetermined position in the outer case 13 along the support surface of the support portion 16 by elastic or plastic deformation of the ribs 18 of the fitting protuberances 17. Moreover, the printed board 15 is urged against the support surface of the support portion 16 in the case body 11 by elastic or plastic deformation of the projecting portion 19, and is thereby clamped between the support surface and the projecting portion 19. Consequently, the printed board 15 is fixed at a predetermined position in the outer case 13 in a direction that is perpendicular to the support surface of the support portion 16.

In this case, even when the diameter of the fitting protuberances 17 and the projecting length of the projecting portion 19 are increased in anticipation of dimensional variations of the cover member 12, the case body 11, and the fitting holes 15a of the printed board 15, since the ribs 18 of the fitting protuberances 17 and the projecting portion 19 are elastically or plastically deformed, the force exerted from the ribs 18 of the fitting protuberances 17 and the projecting portion 19 of the cover member 12 onto the printed board 15 is decreased, and stress produced in the printed board 15 is reduced greatly.

Consequently, breaking, peeling, and soldering cracks of patterns resulting from deformation of the printed board 15 can be avoided, and reliable products can be obtained. Further, since the printed board 15 can be positioned with no play, reliability of the detection device 10 is enhanced. Moreover, the production efficiency of the sensor is enhanced, and the product yield is improved. Therefore, the production cost is reduced greatly.

Figure 4:
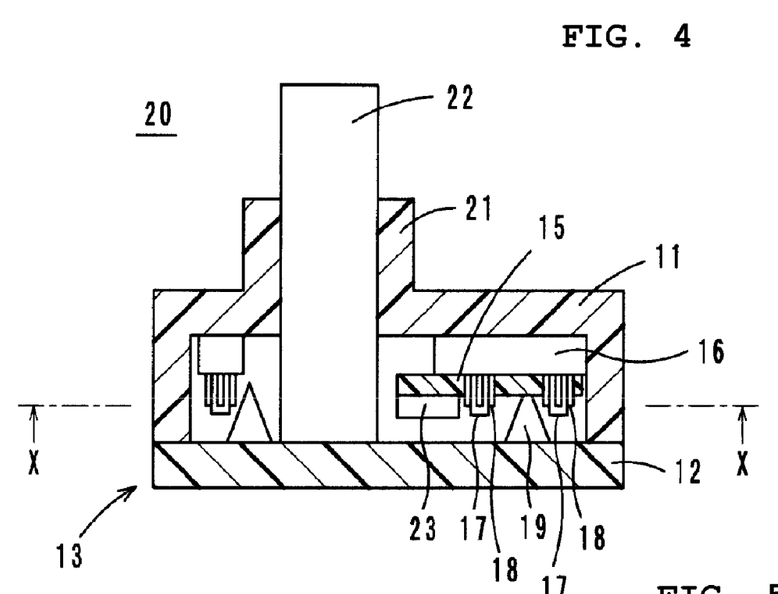
FIG. 4 is a longitudinal sectional view showing a second preferred embodiment (a rotation angle sensor) according to the present invention.
Figure 5:
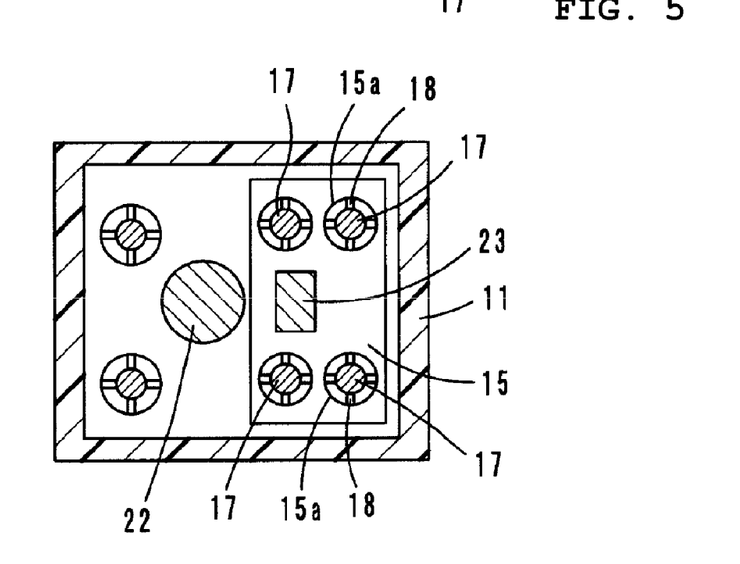
FIG. 5 is a sectional view taken along line X-X in FIG. 4.

Second Preferred Embodiment (FIGS. 4 and 5)

FIG. 4 is an overall longitudinal sectional view of a rotation angle sensor according to a second preferred embodiment of the present invention, and FIG. 5 is a sectional view, taken along line X-X in FIG. 4. A rotation angle sensor 20 is obtained by applying the detection device 10 of the first preferred embodiment to a rotation angle sensor. A case body 11 has a bearing portion 21. A shaft 22 is mounted in an outer case 13 so as to extend through the bearing portion 21 and to reach a cover member 12. A printed board 15 is stored in the outer case 13. The printed board 15 supports a rotary detection component 23 for detecting the rotation amount of the shaft 22, for example, a non-contact detection component such as a Hall element or a photoelectric transducer, or a contact detection component, such as a potentiometer, in which a wiper slides on a resistor. Similarly to the first preferred embodiment, the printed board 15 is held at a predetermined position in the outer case 13 by the cover member 12 and the case body 11. In FIGS. 4 and 5, the same components and portions as those in FIGS. 1 and 2 are denoted by the same reference numerals, and redundant descriptions thereof are omitted.

According to the rotation angle sensor 20, ribs 18 of fitting protuberances 17 and projecting portions 19 of the cover member 12 are elastically or plastically deformed, and stress produced in the printed board 15 is reduced greatly. Therefore, it is possible to avoid breaking, peeling, and soldering cracks of patterns resulting from deformation of the printed board 15. Even the rotation angle sensor for detecting the rotation amount of the shaft 22 can provide advantages similar to those of the first preferred embodiment. Further, according to this preferred embodiment, contact type sensors for detecting the rotation of the shaft 22 and non-contact type sensors for detecting the rotation of the shaft 22 can be produced by using the same outer case 13, according to user's demands for reliability and cost of the rotation angle sensor, and the outer case 13 can be commonly used for a plurality of types of rotation angle sensors. Consequently, the parts management cost is reduced by the decrease in number of types of the outer case 13, and a plurality of types of rotation angle sensors can be produced at low cost.

Figure 6:
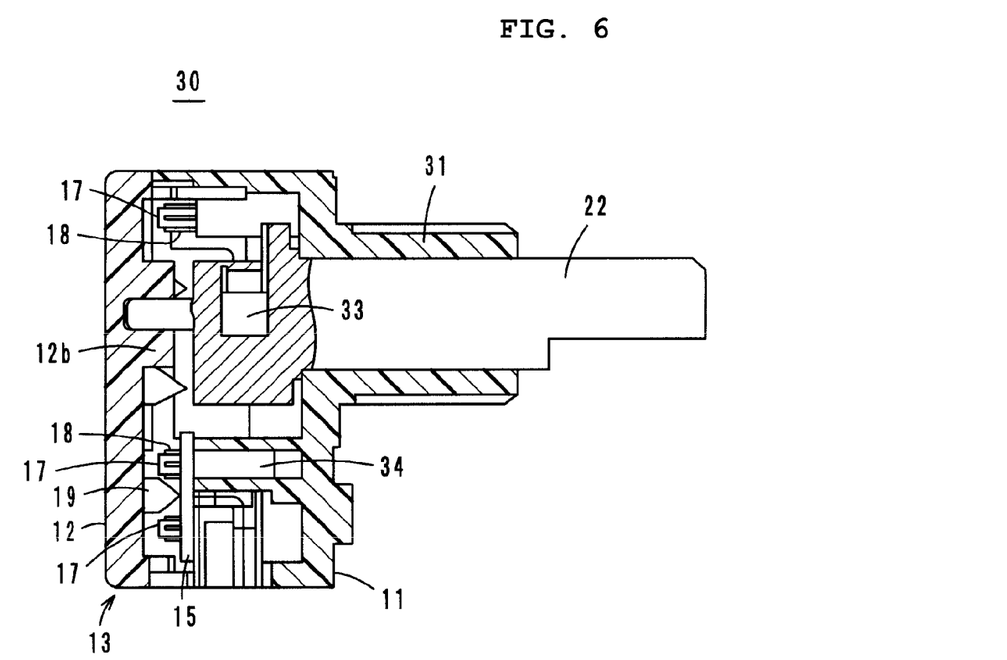
FIG. 6 is a longitudinal sectional view showing a third preferred embodiment (a rotation angle sensor) according to the present invention.

Third Preferred Embodiment (FIG. 6)

FIG. 6 is a longitudinal sectional view of a rotation angle sensor according to a third preferred embodiment of the present invention. A rotation angle sensor 30 is obtained by applying the rotation angle sensor 20 of the second preferred embodiment to a rotation angle sensor that detects the rotation amount of a shaft 22 in a non-contact manner. A case body 11 has a bearing portion 31. The shaft 22 is rotatably mounted in an outer case 13 so as to extend through the bearing portion 31 and reach a bearing portion 12b provided in a cover member 12. A magnet 33 for detecting the rotation amount of the shaft 22 in a non-contact manner is attached to a portion of the shaft 22 disposed in the outer case 13. A printed board 15 is stored in the outer case 13. The printed board 15 supports a rotary detection component 34 formed by a Hall element that senses magnetism of the magnet 33 so as to detect the rotation amount of the shaft 22 in a non-contact manner. Similarly to the first preferred embodiment, the printed board 15 is held at a predetermined position in the outer case 13 by the cover member 12 and the case body 11. In FIG. 6, the same components and portions as those shown in FIGS. 4 and 5 are denoted by the same reference numerals, and redundant descriptions thereof are omitted.

According to the rotation angle sensor 30, the force exerted from ribs 18 of fitting protuberances 17 and projecting portions 19 of the cover member 12 onto the printed board 15 is decreased, and stress produced in the printed board 15 is reduced greatly. Consequently, breaking, peeling, and soldering cracks of patterns resulting from deformation of the printed board 15 can be avoided, and advantages similar to those of the first and second preferred embodiments can be achieved. Further, according to this preferred embodiment, since the rotation amount of the shaft 22 is detected in a non-contact manner with the magnet 33 and the rotary detection component 34 formed by a Hall element, trouble caused in a potentiometer, for example, noise and detection failure of a rotation signal due to a poor connection, can be avoided, and a reliable rotation angle sensor can be obtained.

Figure 7:
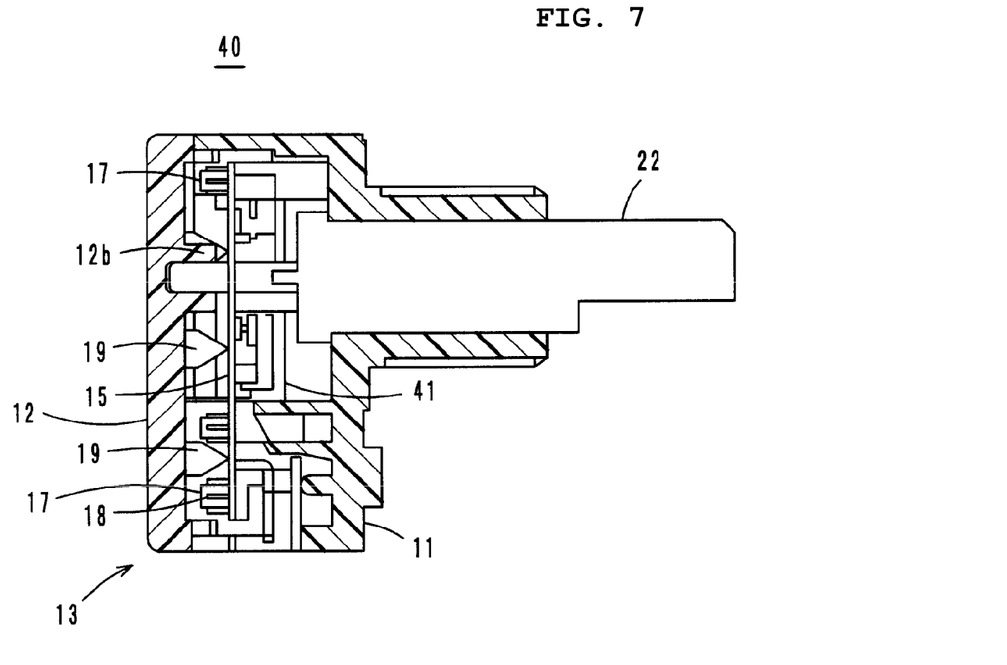
FIG. 7 is a longitudinal sectional view showing a fourth preferred embodiment (a rotation angle sensor) according to the present invention.

Fourth Preferred Embodiment (FIG. 7)

FIG. 7 is a longitudinal sectional view of a rotation angle sensor according to a fourth preferred embodiment of the present invention. A rotation angle sensor 40 is obtained by applying the rotation angle sensor 20 of the second preferred embodiment to a rotation angle sensor that detects the rotation amount of a shaft 22 with a potentiometer 41. The shaft 22 extends through the potentiometer 41 mounted on a printed board 15, and is loosely and rotatably fitted in a bearing portion 12b provided in a cover member 12. The printed board 15 on which the potentiometer 41 is mounted is stored in an outer case 13. Similarly to the first preferred embodiment, the printed board 15 is held at a predetermined position in the outer case 13 by the cover member 12 and a case body 11. In FIG. 7, the same components and portions as those shown in FIGS. 4 and 5 are denoted by the same reference numerals, and redundant descriptions thereof are omitted.

According to the rotation angle sensor 40, the force exerted from ribs 18 of fitting protuberances 17 and tapered projecting portions 19 provided in the cover member 12 onto the printed board 15 is decreased, and stress produced in the printed board 15 is reduced. Consequently, breaking, peeling, and soldering cracks of patterns resulting from deformation of the printed board 15 can be avoided, and advantages similar to those of the first, second, and third preferred embodiments can be achieved. Further, according to this preferred embodiment, since a relatively low-cost potentiometer can be used as the component for detecting the rotation of the shaft 22, the parts cost of the sensor is reduced further. The specifications of the rotation angle sensor can be easily changed by simply changing the specifications of the potentiometer 41 mounted on the printed board 15.

Figure 8:
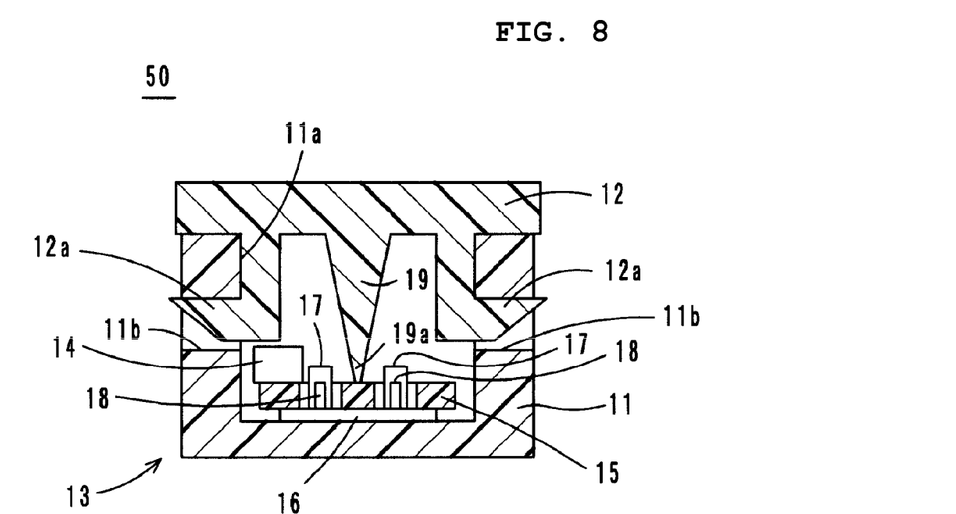
FIG. 8 is a longitudinal sectional view showing a fifth preferred embodiment (a rotation angle sensor) according to the present invention.

Fifth Preferred Embodiment (FIG. 8)

FIG. 8 is an overall outside view of a rotation angle sensor according to a fifth preferred embodiment of the present invention. In a rotation angle sensor 50, when a cover member 12 is fitted in an opening 11a of a case body 11, as in the detection device 10 of the first preferred embodiment that has been described with reference to FIG. 1, hook-shaped retaining claws 12a provided in the cover member 12 are engaged with retaining holes 11b provided on the inner periphery of the opening 11a of the case body 11, and the cover member 12 is fixed to the opening 11a by so-called snap fitting. Other structures are just the same as those shown in FIG. 1. Therefore, in FIG. 8, the same components and portions as those in FIG. 1 are denoted by the same reference numerals, and redundant descriptions thereof are omitted.

According to the rotation angle sensor 50, in addition to the advantages provided by the detection device 10 of the first preferred embodiment, the cover member 12 can be fixed to the opening 11a of the case body 11 by so-called snap fitting when fitted in the opening 11a. Therefore, assembly of the sensor is facilitated, the production time is greatly reduced, and the production cost is reduced further.

Other Preferred Embodiments

The detection device and the rotation angle sensor according to the present invention are not limited to the above-described preferred embodiments, and various structures can be adopted within the scope of the invention.

Figure 9A:
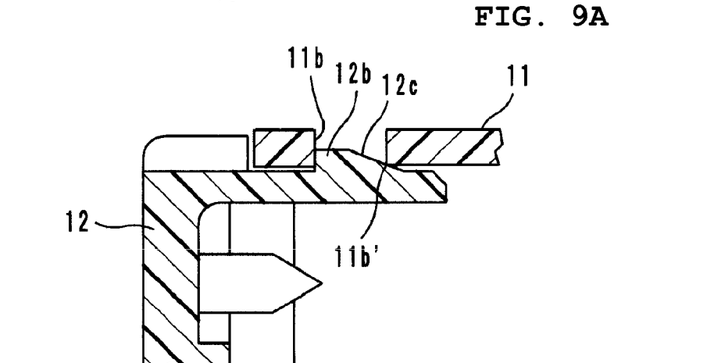
FIGS. 9A and 9B are cross-sectional views showing modifications of retaining claws in the fifth preferred embodiment of the present invention.
Figure 9B:
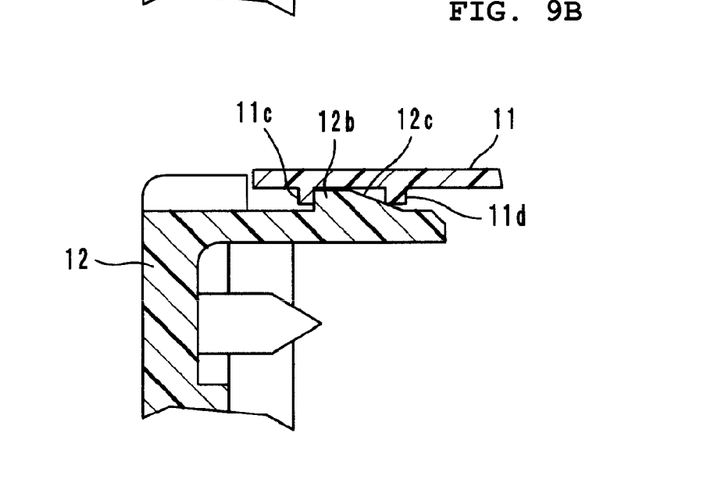

For example, in the fifth preferred embodiment, each retaining claw 12a provided in the cover member 12 may be shaped to have an inclined portion 12c, as in a retaining claw 12b shown in FIGS. 9A and 9B. In FIG. 9A, the inclined portion 12c serves as a lead portion that allows the retaining claw 12b to be smoothly engaged with the retaining hole 11b. Further, the retaining claw 12b is engaged with a portion of the rim of the retaining hole 11b, and the inclined portion 12c is in contact with another portion 11b' of the rim of the retaining hole 11b. In FIG. 9B, the inclined portion 12c serves as a lead portion that allows the retaining claw 12b to be smoothly engaged with one retaining portion 11c, of two protuberances (retaining portions 11c and 11d). Further, the retaining claw 12b is engaged with an edge of the retaining portion 11c, and the inclined portion 12c is in contact with an edge of the other retaining portion 11d. Consequently, the case body 11 and the cover member 12 can be firmly and precisely fixed with no play therebetween.

In the fifth preferred embodiment, the cover member 12 may be welded or bonded to the opening 11a of the case body 11 without forming the retaining claws 12a and the retaining holes 11b in the cover member 12 and the case body 11. In this case, airtightness of the outer case 13 is enhanced, and resistance to dust and moisture is increased.

Alternatively, a tapered portion 18a may be provided at the top of the rib 18 of each fitting protuberance 17, as shown in FIG. 10. The tapered portion 18a serves as a lead portion that allows the fitting hole 15a of the printed board 15 to be smoothly fitted on the fitting protuberance 17.

While the shaft 22 is formed by joining a thick portion and a thin portion in the fourth preferred embodiment (see FIG. 7), the thick portion and the thin portion may be formed integrally. By integrally forming the thick portion and the thin portion, the strength of the shaft 22 is increased.

As described above, the various preferred embodiments of the present invention are useful for a detection device and a rotation angle sensor that detect the physical quantity such as magnetism, and particularly, is superior in reliability and production cost.

While preferred embodiments of the present invention have been described above, it is to be understood that variations and modifications will be apparent to those skilled in the art without departing the scope and spirit of the present inven-

What is claimed is:

1. A detection device comprising:
   a substrate;
   a detection component arranged on the substrate to detect a physical quantity;
   an outer case including a case body and a cover member fitted in an opening of the case body, the outer case accommodating the substrate and detection component therein such that the substrate is held at a predetermined position in the outer case by the cover member and the case body; wherein
   the case body includes a support portion protruding from an inner bottom surface of the case body so as to support the substrate;
   the cover member includes a projecting portion projecting toward the support portion so that the substrate is clamped between the projecting portion and the support portion;
   the support portion includes a fitting protuberance fitted in a fitting hole provided in the substrate so as to position the substrate on the support portion;
   the fitting protuberance has a rib protruding from an outer peripheral surface of the fitting protuberance in the radial direction;
   the projecting portion of the cover member is formed of a material that is elastically or plastically deformed by contact with the substrate; and
   the rib of the fitting protuberance is formed of a material that is elastically or plastically deformed by contact with an inner peripheral surface of the fitting hole of the substrate.

2. The detection device according to claim 1, wherein, when the cover member is fitted in the opening of the case body, a retaining claw provided in one of the case body and the cover member is engaged with a retaining portion provided in the other.

3. The detection device according to claim 2, wherein the retaining portion includes a hole, and the retaining claw includes a portion engaged with a portion of a rim of the hole of the retaining portion, and an inclined portion in contact with another portion of the rim of the hole of the retaining portion.

4. The detection device according to claim 2, wherein the retaining portion includes a plurality of protuberances, and the retaining claw includes a portion engaged with one edge portion of the retaining portion, and an inclined portion in contact with another edge portion of the retaining portion.

5. The detection device according to claim 1, wherein the case body is welded or bonded to the cover member.

6. A rotation angle sensor comprising:
   a substrate;
   a detection component arranged on the substrate to detect a rotation amount of a shaft;
   an outer case including a case body and a cover member fitted in an opening of the case body, the outer case accommodating the substrate and detection component therein such that the substrate is held at a predetermined position in the outer case by the cover member and the case body; wherein
   the shaft extends through the case body toward the cover member, and is rotatably mounted to the outer case;
   the case body includes a support portion protruding from an inner bottom surface of the case body so as to support the substrate;
   the cover member includes a projecting portion projecting toward the support portion so that the substrate is clamped between the projecting portion and the support portion;
   the support portion includes a fitting protuberance fitted in a fitting hole provided in the substrate so as to position the substrate on the support portion;
   the fitting protuberance includes a rib protruding from an outer peripheral surface of the fitting protuberance in the radial direction;
   the projecting portion of the cover member is formed of a material that is elastically or plastically deformed by contact with the substrate; and
   the rib of the fitting protuberance is formed of a material that is elastically or plastically deformed by contact with an inner peripheral surface of the fitting hole of the substrate.

7. The rotation angle sensor according to claim 6, wherein the detection component detects the rotation amount of the shaft in a non-contact manner.

8. The rotation angle sensor according to claim 7, wherein the detection component is a magnetic detection element that detects the rotation amount of the shaft by detecting magnetism of a magnetism generator attached to the shaft.

9. The rotation angle sensor according to claim 6, wherein the detection component includes an electrical contact element that cooperates with the shaft, and a conversion element that outputs an electrical signal corresponding to a contact position of the electrical contact element.

10. The rotation angle sensor according to claim 9, wherein the detection component is a potentiometer attached to the substrate.

11. The rotation angle sensor according to claim 6, wherein, when the cover member is fitted in the opening of the case body, a retaining claw provided in one of the case body and the cover member is engaged with a retaining portion provided in the other.

12. The rotation angle sensor according to claim 11, wherein the retaining portion includes a hole, and the retaining claw includes a portion engaged with a portion of a rim of the hole of the retaining portion, and an inclined portion in contact with another portion of the rim of the hole of the retaining portion.

13. The rotation angle sensor according to claim 11, wherein the retaining portion includes a plurality of protuberances, and the retaining claw includes a portion engaged with one edge portion of the retaining portion, and an inclined portion in contact with another edge portion of the retaining portion.

14. The rotation angle sensor according to claim 6, wherein the case body is welded or bonded to the cover member.

* * * * *